(12) United States Patent
Stanich et al.

(10) Patent No.: US 9,661,154 B1
(45) Date of Patent: May 23, 2017

(54) INK MODEL DERIVATION MECHANISM USING WEIBULL DISTRIBUTION FUNCTION

(71) Applicants: Mikel John Stanich, Longmont, CO (US); Nikita Gurudath, Boulder, CO (US); Larry M. Ernst, Longmont, CO (US)

(72) Inventors: Mikel John Stanich, Longmont, CO (US); Nikita Gurudath, Boulder, CO (US); Larry M. Ernst, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/053,478

(22) Filed: Feb. 25, 2016

(51) Int. Cl.
*H04N 1/00* (2006.01)
*H04N 1/405* (2006.01)

(52) U.S. Cl.
CPC ..... *H04N 1/00068* (2013.01); *H04N 1/00005* (2013.01); *H04N 1/00034* (2013.01); *H04N 1/00092* (2013.01); *H04N 1/405* (2013.01)

(58) Field of Classification Search
None
See application file for complete search history.

(56) References Cited

U.S. PATENT DOCUMENTS

| | | | |
|---|---|---|---|
| 4,956,718 A * | 9/1990 | Numakura | H04N 1/4072 358/3.06 |
| 5,260,806 A * | 11/1993 | Samworth | H04N 1/4078 358/3.01 |
| 5,943,477 A | 8/1999 | Rao et al. | |
| 6,484,631 B2 * | 11/2002 | Degani | H04N 1/6097 101/171 |
| 6,694,109 B1 * | 2/2004 | Donaldson | G03G 15/5041 347/131 |
| 6,697,582 B1 * | 2/2004 | Scheuer | G03G 15/01 399/49 |
| 6,906,828 B2 * | 6/2005 | VanDuyn | H04N 1/407 358/504 |
| 6,999,199 B2 * | 2/2006 | Degani | H04N 1/407 358/3.06 |
| 7,142,332 B2 * | 11/2006 | Degani | H04N 1/407 358/2.1 |
| 7,791,630 B2 | 9/2010 | Stolk et al. | |

(Continued)

FOREIGN PATENT DOCUMENTS

| | | |
|---|---|---|
| JP | 2003011397 | 1/2003 |
| JP | 2008076438 | 4/2008 |

OTHER PUBLICATIONS

Hersch et al., "Deducing Ink Thickness Variations by a Spectral Prediction Model", Color Research and Application, vol. 34, No. 6, Dec. 2009, pp. 432-442.

(Continued)

*Primary Examiner* — Scott A Rogers
(74) *Attorney, Agent, or Firm* — Alpine Technology Law Group, LLC (57) ABSTRACT

A printing system is disclosed. The printing system includes a printer controller to receive optical density (OD) measurement data corresponding to application of a halftone pattern using ink on a medium in a printing system and calculate a predicted OD versus normalized ink coverage relationship for the printing system based on the received OD measurement data.

19 Claims, 7 Drawing Sheets

(56) References Cited

U.S. PATENT DOCUMENTS

| | | | | |
|---|---|---|---|---|
| 7,874,634 B2* | 1/2011 | Horii | ............... | B41J 19/142 |
| | | | | 347/15 |
| 8,180,230 B2* | 5/2012 | Klassen | ............... | G03G 15/553 |
| | | | | 399/27 |
| 8,320,022 B2* | 11/2012 | Morishita | ............ | G06K 15/107 |
| | | | | 347/14 |
| 8,382,228 B2* | 2/2013 | Uchiyama | ............... | B41J 2/2052 |
| | | | | 347/15 |
| 2002/0149785 A1* | 10/2002 | Chu | ............... | B41J 2/17546 |
| | | | | 358/1.9 |
| 2005/0088672 A1* | 4/2005 | Johnson | ............... | H04N 1/6055 |
| | | | | 358/1.9 |
| 2009/0296106 A1* | 12/2009 | Donaldson | ............. | H04N 1/603 |
| | | | | 358/1.9 |
| 2012/0120428 A1* | 5/2012 | Henderson | ........... | H04N 1/6038 |
| | | | | 358/1.13 |
| 2013/0176600 A1 | 7/2013 | Chandu et al. | | |
| 2013/0222461 A1* | 8/2013 | Kaszynski | ............. | B41J 2/2128 |
| | | | | 347/19 |

OTHER PUBLICATIONS

Bugnon et al., "Calibrating Ink Spreaking Curves by Optimal Selection of Tiles from Printed Color Images", Color Imaging SVI, vol 7866, paper 786612, 2011, pp. 1-16.

Yamazaki, H., "A Modified Method for the Determination of the Ink Transfer Parameters by Non-Linear Optimization", Japan Tappi Journal, vol. 45 (1991) No. 7.

\* cited by examiner

INK MODEL DERIVATION MECHANISM USING WEIBULL DISTRIBUTION FUNCTION

FIELD OF THE INVENTION

The invention relates to the field of image reproduction, and in particular, to digital halftoning.

BACKGROUND

Halftoning is a process by which continuous tone images are approximated by a pattern of pixels that can achieve only a limited number of discrete intensities. An example of this is the rendering of gray tones with black and white pixels, such as in a newspaper photograph. A halftone pattern is made up of a region of pixels referred to as a halftone cell. In conventional digital halftoning (e.g., halftoning that uses rational tangent angles), a halftone cell includes a specific, repeatable pattern. The discrete number of tonal levels of a halftone pattern depends upon the number of pixels in the halftone cell and the number of exposure levels or dot sizes for each pixel.

Halftones yield different optical densities on different paper types, depending on paper characteristics (e.g., coating, pulp, and chemicals used in the manufacturing process). In addition, for a given paper, there exists a fundamental characteristic of an ink printing system, which relates to optical Density (OD) and ink coverage. However, without detailed information about the specifics of the system, such as the drop sizes and halftones for an ink-jet printing system, the characteristic OD versus ink coverage information cannot be determined.

Accordingly, a mechanism to derive an ink model is desired.

SUMMARY

In one embodiment, a printing system is disclosed. The printing system includes a printer controller to receive optical density (OD) measurement data corresponding to application of a halftone pattern using ink on a medium in a printing system and calculate a predicted OD versus normalized ink coverage relationship for the printing system based on the received OD measurement data.

In a further embodiment, a method is disclosed including receiving optical density (OD) measurement data corresponding to application of a halftone pattern using ink on a medium in a printing system. Based on the OD data, a predicted OD versus normalized ink coverage relationship for the printing system is calculated.

BRIEF DESCRIPTION OF THE DRAWINGS

A better understanding of the present invention can be obtained from the following detailed description in conjunction with the following drawings, in which.

DETAILED DESCRIPTION

A mechanism to derive an ink model is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
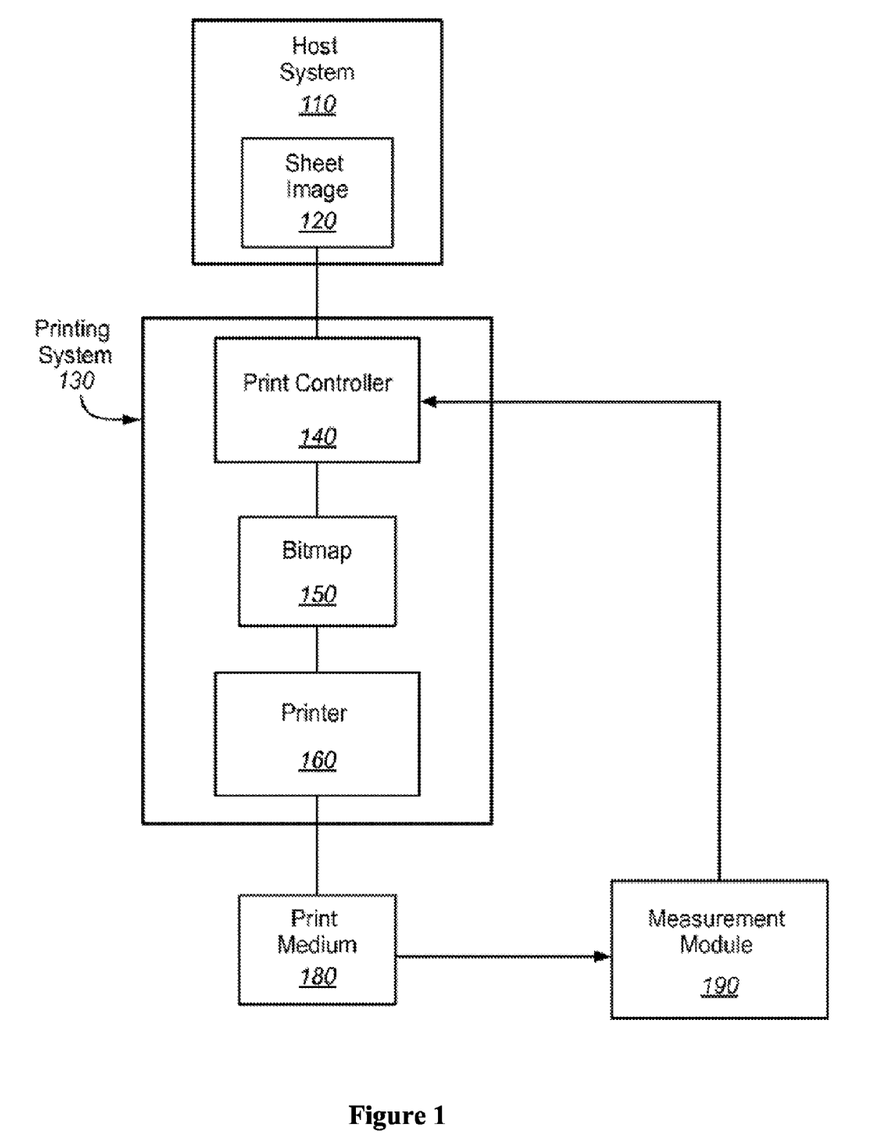
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 (e.g., paper, plastic, metal, glass, textile, fabric or other tangible mediums suitable for printing) via a printer 160. The resulting print medium 180 may be printed in color and/or in any number of gray shades, including black and white (e.g., Cyan, Magenta, Yellow, and blacK, (CMYK)). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for printing to the print medium 180 via the printer 160. The printing system 130 may be a high-speed printer operable to print relatively high volumes (e.g., greater than 100 pages per minute). The print medium 180 may be continuous form paper, cut sheet paper, and/or any other tangible medium suitable for printing. The printing system 130, in one generalized form, includes the printer 160 that presents the bitmap 150 onto the print medium 180 (e.g., ink, etc.) based on the sheet image 120.

The print controller 140 may be any system, device, software, circuitry and/or other suitable component operable to transform the sheet image 120 for generating the bitmap 150, in accordance with printing onto the print medium 180. In this regard, the print controller 140 (e.g. Digital Front End, DFE) may include processing and data storage capabilities. In one embodiment, measurement module 190 (e.g. spectrodensitomer, spectrophotometer, etc.) is implemented as part of a halftone calibration system to obtain measurements of the printed medium 180. The measured results are communicated to print controller 140 to be used in the halftone calibration process. The measurement system may be a stand-alone process or be integrated into the printing system 130.

An additional application is to compare the OD versus ink coverage response obtained from a printing system with well-known ink coverage to further predicted responses for a printing system that does not have a known ink coverage. In this way the system with unknown ink coverage can be compared to the known system to understand how the ink coverage compares.

Figure 2:
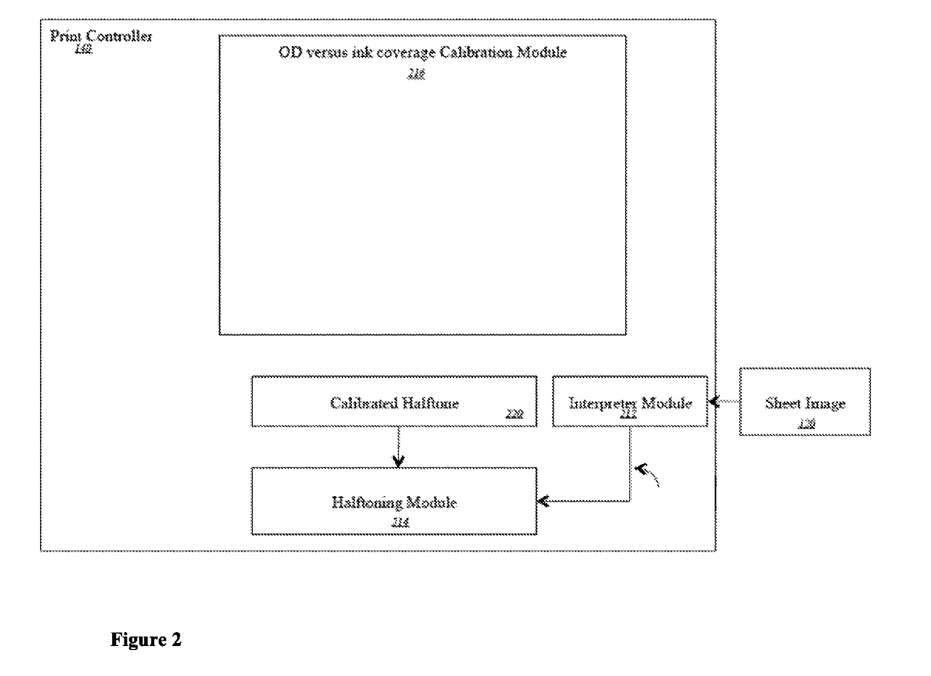
FIG. 2 is a block diagram of one embodiment of a print controller.

FIG. 2 is a block diagram illustrating an exemplary print controller 140. The print controller 140, in its generalized form, includes an interpreter module 212, a halftoning module 214, and an OD versus ink coverage calibration module 216. These separate components may represent hardware used to implement the print controller 140. Alternatively or additionally, the separate components may represent logical blocks implemented by executing software instructions in a processor of the printer controller 140.

The interpreter module 212 is operable to interpret, render, rasterize, or otherwise convert images (e.g., raw sheet-side images such as sheet image 120) of a print job into sheetside bitmaps. The sheetside bitmaps generated by the interpreter module 212 are each a 2-dimensional array of pixels representing an image of the print job (i.e., a Continuous Tone Image (CTI)), also referred to as full sheetside bitmaps. The 2-dimensional pixel arrays are considered "full" sheetside bitmaps because the bitmaps include the entire set of pixels for the image. The interpreter module 212 is operable to interpret or render multiple raw sheetsides concurrently so that the rate of rendering substantially matches the rate of imaging of production print engines.

The halftoning module 214 is operable to represent the sheetside bitmaps as halftone patterns of ink. For example, the halftoning module 214 may convert the pixels to halftone patterns of CMYK ink for application to the paper. Thus, halftoning module 214 converts a contone image to a binary/multi-bit level image at the same dots per inch (dpi) as the full sheetside bitmap. This is due to halftoning, which is typically implemented as a point operation creating a one to one correspondence of the contone pixels and the half-toned image pixels. The resulting halftoned image is used to drive a printhead mechanism of the printer 160

Print controller 140 also includes an OD versus ink coverage calibration module 216. Calibration module 216 performs an OD versus ink coverage calibration process. Calibrated halftone 220 is then received at halftoning module 214 along with the sheetside bitmap. The calibrated halftone is generated by a different process.

According to one embodiment, OD versus ink coverage calibration module 216 implements an ink model to provide an accurate description as to how an ink interacts with a particular medium (e.g., paper). Although shown as a residing component of print controller 140, other embodiments may feature OD versus ink coverage calibration module 216 as an independent device, or combination of devices, that is communicably coupled to print controller 140.

Weibull cumulative distribution function (CDF) describes the probability that a real-valued random variable X with a given probability will be found at a value less than or equal to x (where x is a one possible value of the random variable X). Intuitively, it is the "area under the curve" function of the probability density function (PDF). Cumulative distribution functions are also used to specify the distribution of multivariate random variables. The Weibull CDF model that is employed uses two parameters.

In one embodiment, the Weibull CDF is modified to incorporate paper white and the solid area maximum optical density. This modified Weibull CDF will be described as simply "Weibull CDF". The forward Weibull CDF relates ink coverage to OD, while the inverse Weibull CDF relates OD to ink coverage. In one embodiment, ink coverage is represented by $$\text{Ink Coverage} = \frac{\text{Total Ink Mass}}{\text{Area}},$$

$$\text{Total Ink Mass} = \sum_{Area} Dropsizesmilligrams$$

Thus, ink coverage is defined as the total ink mass applied to a unit area. In one embodiment, a four parameter Weibull model is implemented using $OD = (p(3)*(1-\exp^{((-(x/p(1))^{p(2)})))} + p(4)$.

In such an embodiment, the two-parameter classical Weibull CDF function has been extended to four parameters to create a paper-ink model. The two additional parameters allow the model to account for paper white and absolute paper referenced OD, where x=ink coverage mass per area, $p(1)$=ink mass per area scale factor, which is similar to the classical Weibull scale factor in the way it influences the shape of the function, $p(2)$=slope factor.

An alternate interpretation of the variable x is to assume that it is a dimensionless normalized ink coverage quantity. In this case the maximum ink coverage is assumed to be a value of one. This can be used in cases where the absolute ink coverage is not known, only the relative ink coverage. The parameter $p(1)$ becomes the normalized ink scale factor in this case.

This factor influences the shape of the function similarly to the classical Weibull slope factor, $p(3)$=maximum paper referenced OD and $p(4)$=paper white OD. Slope factors $p(1)$ and $p(2)$ are the parameters used in the classical two parameter Weibull CDF function. The $p(1)$ scale factor adjusts the shape of the curve so as to modify how much ink coverage is required to achieve various ODs. Higher values for $p(1)$ require more ink coverage to achieve higher OD.

Figure 3:
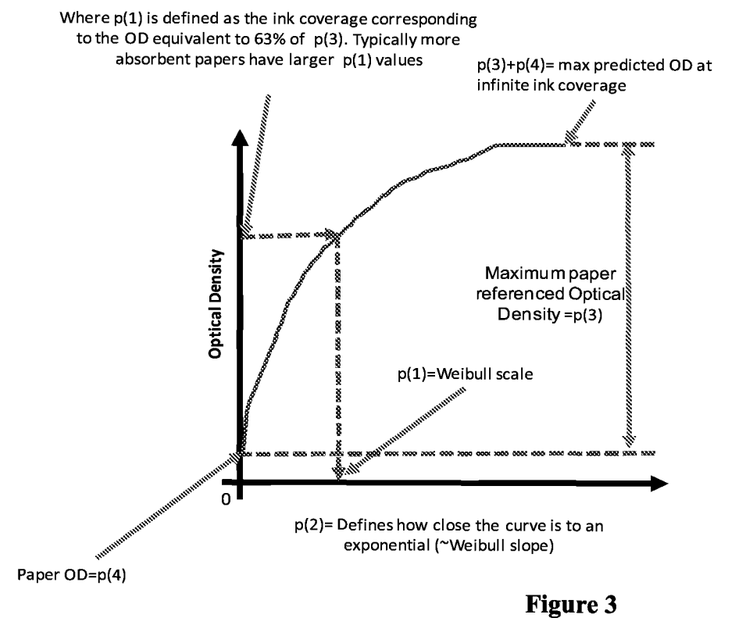
FIG. 3 is a graph illustrating Weibull parameters.

In addition, since $p(1)$ is similar to two-parameter classical Weibull slope, it indicates the point of the curve where the ink coverage is approximately 63% of the paper referenced maximum OD, parameter $p(3)$. The model provides a value for the maximum absolute OD for the ink/paper or other media. This maximum OD will be given by the sum of the $p(3)$ and $p(4)$ parameters. FIG. 3 is a graph illustrating the four Weibull parameters.

The known method to establish this OD versus coverage relationship is to have detailed halftone information regarding precisely the ink coverage for each halftone pattern. However in many instances, such information is unknown. It is the patterns in the calibrated halftone 220 that dictate the actual ink coverage for each pattern. In a printer system, where the calibrated halftone is internal to the system, the dot patterns may not be known explicitly.

According to one embodiment a combination of OD measurements are employed to derive the ink model, such as a print system having two pass capability. In this system two sets of ink jet arrays are utilized to obtain higher ink coverage and consequently higher D. OD capability. The same image data is transmitted to each set of ink arrays and therefore the image printing is essentially printed twice with two similarly calibrated halftones. This is referred to as a dual pass system.

In such a system the opportunity exists to obtain printing using one array (single pass) and employing both arrays (dual pass). In this system the ink coverage for dual pass is two times the ink coverage of the single pass. According to one embodiment, print controller 140 calculates an estimated OD versus ink coverage relationship for printing system 130 for a specific ink by implementing a combination of single-pass and dual-pass OD versus digital count data. Digital count is a discrete level in the sheetside bitmap contone image (e.g. in an 8 bit system digital count values are the integers between and including 0 and 255).

In such an embodiment, halftone calibration modules 216 receives a set of OD measurements taken by measurement module 190 during single-pass and dual-pass printing application. Dual pass printing is essentially two single pass printing applications of a halftone pattern to print medium 180. The essential requirement is having a set of measurements having a lower and higher ink coverage with a relationship between them.

Furthermore, more than two measurements may be employed again with a known relationship of ink coverage for each set of measurements. Those measurements are subsequently used to derive the Weibull CDF function. In one embodiment, a single-pass operation involves a halftone pattern being used at printer 160 to apply image data to medium 180.

A dual-pass operation involves using basically the same halftone pattern to print image data twice. The characteristics include the patterns for each single pass having the same ink coverage. Thus, the combined coverage resulting from the dual pass is therefore twice the ink coverage of a single pass. The OD of ink applied during both the single-pass and double-pass printing operations is measured at measurement module 190. It further should be understood that a range of digital count values, each corresponding to a given halftone pattern, is printed and analyzed by module 190.

In a further embodiment, a single-pass only application may be implemented. In such an embodiment, a double-pass operation may be simulated by creating a test master having a range of duty cycles. This can be implemented for example using a mask pattern approach. In this case the dual pass is simulated using the original halftone patterns without alteration combined with a 50% duty cycle mask pattern that allows only 50% of the corresponding halftone pattern to print. This is repeated for the full range of halftone patterns such that each pattern for a given digital count, has an unmasked and 50% masked version.

The mask pattern embodiment is to sample the halftone pattern such that the relationship of ink coverage between the simulated dual pass and single pass is a factor of two. The 50% duty cycle factor is an example. However, other embodiments may implement any duty cycle or duty cycles, since more than one duty cycle for each pattern is also permissible and may provide additional data for the Weibull CDF regression.

Subsequently, a non-linear optimization is performed using the OD tuple data to find unknown Weibull parameters, p(1), p(2), p(3) and (p4), where the n tuple data includes a set of OD measurements for a given halftone pattern with multiple maskings applied or for dual pass and single pass. In the case of dual pass and single pass, the n tuple comprises pairs of OD measurements. Additionally, in the case of masked patterns n corresponds to the number of masks employed including the case of "no mask".

An additional factor in obtaining a Weibull CDF non-linear regression is that the maximum ink coverage is also known. The maximum ink coverage occurs at the highest digital count for dual pass or in the masked simulation at the highest digital count having no masking applied. The maximum ink coverage may not be essential in that the case where the maximum ink coverage occurs can be assumed to have normalized ink coverage of one. This typically occurs at the highest digital count value for dual pass or in the simulated case, where at the highest digital count value and no masking is utilized. This still provides valuable fundamental OD characteristics for a printing system on a relative basis.

Figure 4:
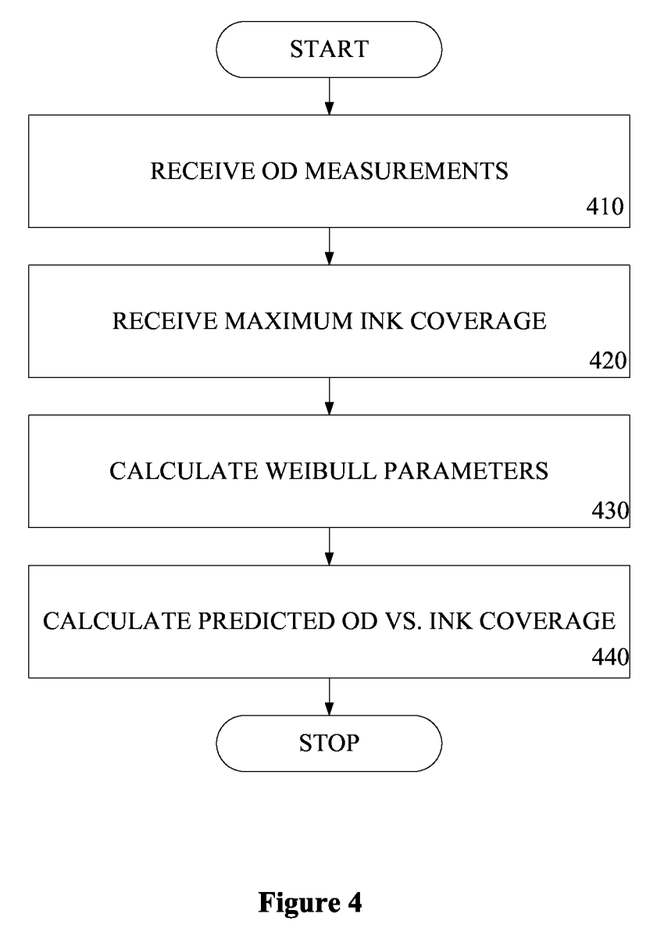
FIG. 4 is a flow diagram illustrating one embodiment of a process for deriving an ink model.

FIG. 4 is a flow diagram illustrating one embodiment of a process for deriving an ink model. At processing block 410, the single-pass and double-pass OD measurements are received. At processing block 420, the maximum ink coverage is received, or a value of one for the normalized maximum ink coverage case is assumed. In one embodiment, the maximum ink coverage is determined by ink monitor testing, where the actual ink used has been calculated from ink usage experiments printing the different halftone patterns.

In particular, the case where the halftone pattern for a solid area is printed, which would correspond to the maximum ink coverage. However in another embodiment, the maximum ink coverage is determined using a theoretical ink drop size for large drops. In another embodiment, normalized maximum ink coverage is assumed to be a value of one for the dual pass solid area and 0.5 for single pass solid area.

At processing block 430, the Weibull parameters are derived. In one embodiment, the parameters are derived using a non-linear optimization. Since it is known that ink coverage of dual-pass at the same tint level is known to be twice the coverage of single-pass, the non-linear optimization may be performed by solving a dual pass/single pass equation represented by:

$$OD2(DC)=W(2*W\_inv(OD1(DC))),$$

where OD2 is the dual pass OD response versus Digital Count (DC), OD1 is the single pass OD response versus DC, W is the forward Weibull function (ink coverage>>OD), W_inv is the inverse Weibull function (OD>>ink coverage). In one embodiment, the same parameters are used for both directions.

It should be understood that for the simulated case, using masking patterns, that the factor of 2 would be replaced by the corresponding duty cycle of the masking (e.g. a 33% duty cycle mask would employ a factor of 3.0 in the above equation instead of a factor of 2.0). If multiple duty cycle data sets are employed in the simulation an additional equation would be added corresponding to the added duty cycles. In this case the non-linear optimization would have multiple equations. Thus, alternately solving for OD1(DC)= W(0.5*W_inv(OD2(DC)) may provide more stability during the optimization process for the case of highly saturated systems where the OD remains relatively constant at high coverage.

Figure 5:
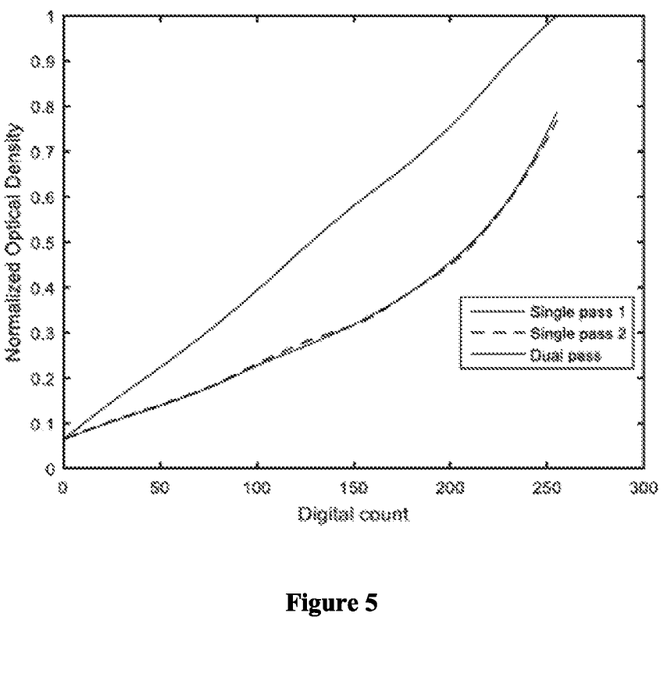
FIG. 5 illustrates one embodiment of a graph of normalized optical density as a function of digital count based on measured data.

At processing block 440, the predicted OD is calculated. FIG. 5 illustrates one embodiment of a graph of normalized optical density as a function of digital count based on measured data. Where normalized means actual OD divided by the maximum dual pass OD. As shown in FIG. 5, the curves for the first pass and second are approximately the same, while the dual pass curve is higher due to the increased ink coverage.

Figure 6:
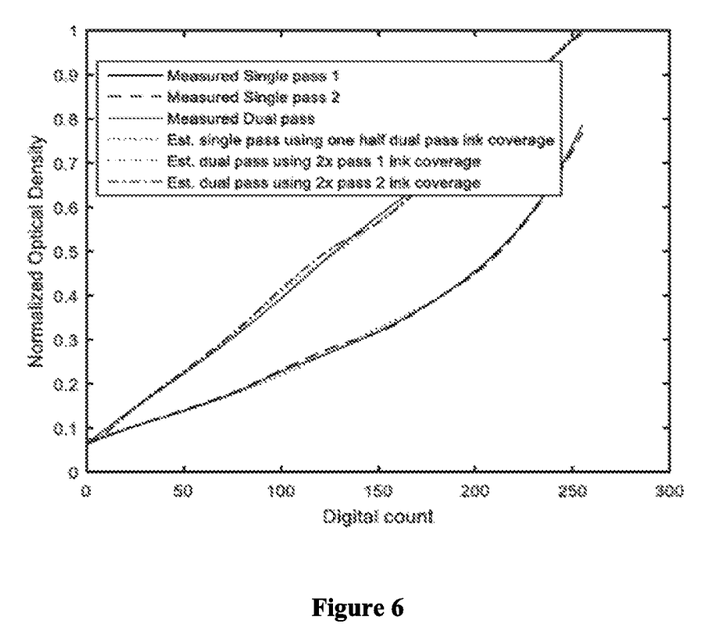
FIG. 6 illustrates one embodiment of a graph of normalized optical density as a function of digital count based on measured data and data derived from a non-linear optimization.

FIG. 6 illustrates one embodiment of a graph of normalized optical density as a function of digital count based on measured data and data derived from a non-linear optimization. As shown in FIG. 6, the curves for the estimated OD calculations for dual pass, assuming twice the ink coverage of single pass, are approximately the same as the measured dual pass curve. As a further test the estimated normalized OD for single pass, assuming one half the coverage for dual pass, also closely follows the measured single pass curves. The final estimated Weibull CDF is a model of the printing system that predicts OD versus the ink coverage and not digital count.

Figure 7:
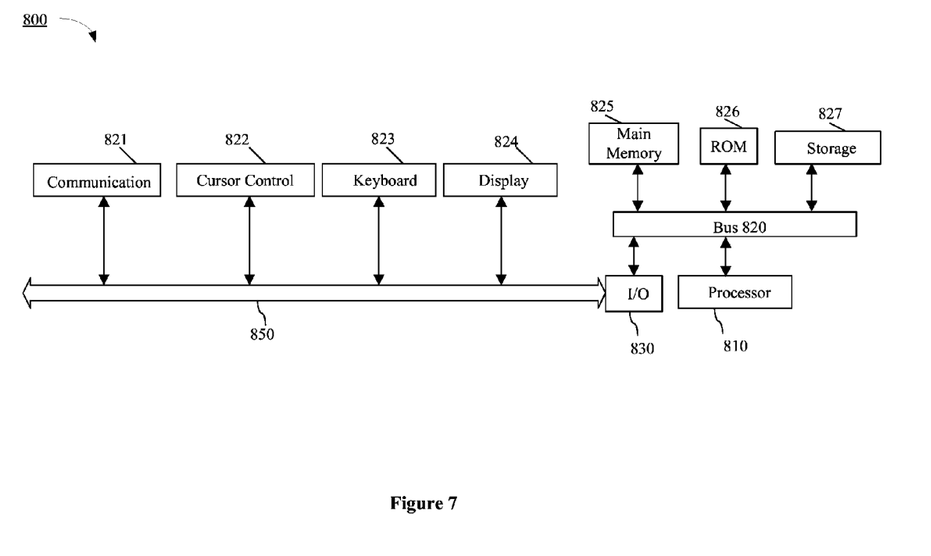
FIG. 7 illustrates one embodiment of a computer system.

FIG. 7 illustrates a computer system 800 on which print controller 140 and/or halftone calibration module 216 may be implemented. Computer system 800 includes a system bus 820 for communicating information, and a processor 810 coupled to bus 820 for processing information.

Computer system 800 further comprises a random access memory (RAM) or other dynamic storage device 825 (referred to herein as main memory), coupled to bus 820 for storing information and instructions to be executed by processor 810. Main memory 825 also may be used for storing temporary variables or other intermediate information during execution of instructions by processor 810. Computer system 800 also may include a read only memory (ROM) and or other static storage device 826 coupled to bus 820 for storing static information and instructions used by processor 810.

A data storage device 825 such as a magnetic disk or optical disc and its corresponding drive may also be coupled to computer system 800 for storing information and instructions. Computer system 800 can also be coupled to a second I/O bus 850 via an I/O interface 830. A plurality of I/O devices may be coupled to I/O bus 850, including a display device 824, an input device (e.g., an alphanumeric input device 823 and or a cursor control device 822). The communication device 821 is for accessing other computers (servers or clients). The communication device 821 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A non-transitory machine-readable medium including data that, when accessed by a machine, cause the machine to:
   receive optical density (OD) measurement data corresponding to application of a halftone pattern using ink on a medium in a printing system; and
   calculate a predicted OD versus normalized ink coverage relationship for the printing system based on the received OD measurement data, wherein the predicted OD versus ink coverage relationship is calculated using Weibull distribution function parameters.

2. The machine-readable medium of claim 1, wherein the OD measurement data comprises single-pass OD measurements and dual-pass OD measurements versus digital count.

3. The machine-readable medium of claim 2, wherein the single-pass OD measurements comprise ink measurements of a single application of the halftone pattern image, and the dual-pass OD measurements comprise ink measurements of a double application of the halftone pattern.

4. The machine-readable medium of claim 2, wherein the single-pass OD measurement is simulated from halftone patterns using masking, and dual-pass OD measurement versus digital count is simulated by not masking the halftone image data.

5. The machine-readable medium of claim 4, including data that, when accessed by a machine, further causes the machine to receive a maximum ink coverage measurement.

6. The machine-readable medium of claim 5, including data that, when accessed by a machine, further causes the machine to calculate the Weibull distribution function parameters based on the OD measurement data and one of the normalized ink coverage and maximum ink coverage measurement.

7. The machine-readable medium of claim 6, wherein the Weibull distribution function parameters are calculated using a non-linear optimization.

8. A printing system comprising:
   a printer controller to receive optical density (OD) measurement data corresponding to application of a halftone pattern using ink on a medium in a printing system and calculate a predicted OD versus normalized ink coverage relationship for the printing system based on the received OD measurement data, wherein the predicted OD versus ink coverage relationship is calculated using Weibull distribution function parameters.

9. The printing system of claim 8, further comprising a measurement module to generate the OD measurement data.

10. The printing system of claim 8, wherein the OD measurement data comprises single-pass OD measurements and dual-pass OD measurements versus digital count.

11. The printing system of claim 10, wherein the single-pass OD measurements comprise ink measurements of a single application of the halftone pattern image, and the dual-pass OD measurements comprise ink measurements of a double application of the halftone pattern.

12. The printing system of claim 11, wherein the single-pass OD measurement is simulated from halftone patterns using masking, and dual-pass OD measurements versus digital count is simulated by not masking the halftone image data.

13. The printing system of claim 12, wherein the printer controller receives a maximum ink coverage measurement.

14. The printing system of claim 13, wherein the printer controller calculates the Weibull distribution function parameters based on the OD measurement data and one of the normalized ink coverage and maximum ink coverage measurement.

15. The printing system of claim 14, wherein the Weibull distribution function parameters are calculated using a non-linear optimization.

16. The printing system of claim 15, wherein the printer controller calculates the predicted OD versus ink coverage relationship based on the calculated Weibull distribution function parameters.

17. A method comprising:
receiving optical density (OD) measurement data corresponding to application of a halftone pattern using ink on a medium in a printing system; and
calculating a predicted OD versus normalized ink coverage relationship for the printing system based on the received OD measurement data, wherein the predicted OD versus ink coverage relationship is calculated using Weibull distribution function parameters.

18. The method of claim 17, wherein the OD measurement data comprises single-pass OD measurements and dual-pass OD measurements versus digital count.

19. The method of claim 18, further comprising:
receiving a maximum ink coverage measurement;
calculating the Weibull distribution function parameters based on the OD measurement data and one of the normalized ink coverage and the maximum ink coverage measurement; and
calculating the predicted OD versus ink coverage relationship based on the calculated Weibull distribution function parameters.

* * * * *

UNITED STATES PATENT AND TRADEMARK OFFICE
CERTIFICATE OF CORRECTION

PATENT NO. : 9,661,154 B1
APPLICATION NO. : 15/053478
DATED : May 23, 2017
INVENTOR(S) : Stanich et al.

Page 1 of 1

It is certified that error appears in the above-identified patent and that said Letters Patent is hereby corrected as shown below:

In the Specification

In Column 3, Line 58, delete "a" after "where x is"

In Column 5, Line 8, delete "modules" and insert --module-- after "halftone calibration"

In Column 7, Line 22, delete "825" and insert --827-- after "a data storage device"

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*